2 Sheets—Sheet 1.

G. W. GREENER.
Sulky-Plow.

No. 211,007. Patented Dec. 17, 1878.

Witnesses:
J. W. Garner
W. S. D. Hames

Inventor:
Geo. W. Greener,
per
J. A. Lehmann
Atty.

2 Sheets—Sheet 2.
G. W. GREENER.
Sulky-Plow.
No. 211,007. Patented Dec. 17, 1878.
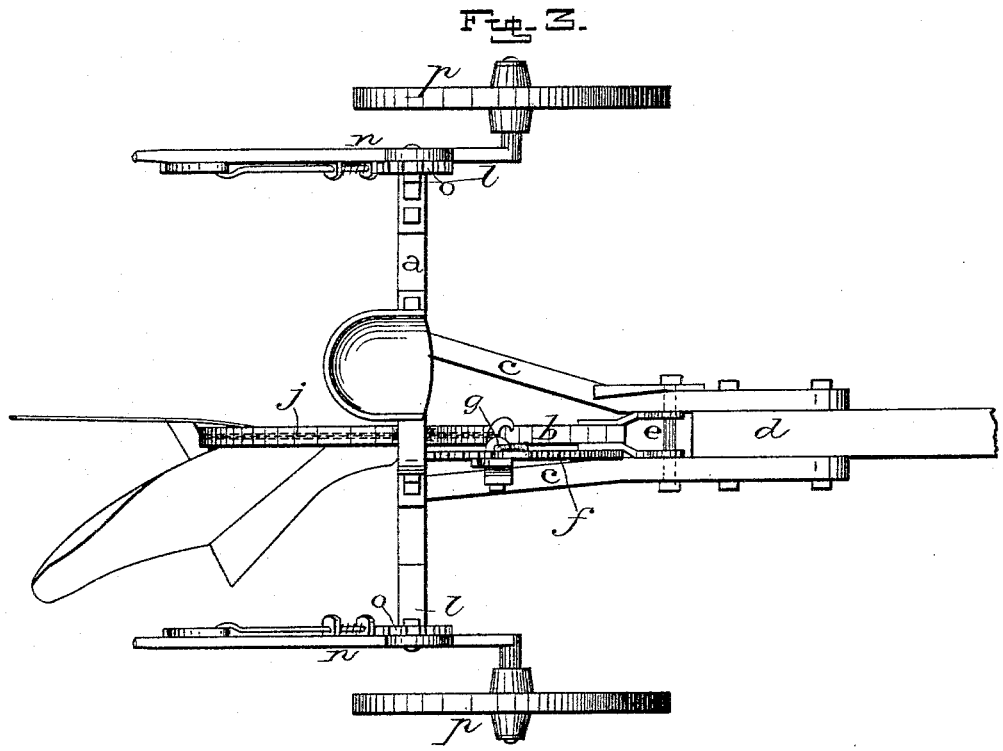

UNITED STATES PATENT OFFICE.

GEORGE W. GREENER, OF LONG POINT, ILLINOIS.

IMPROVEMENT IN SULKY-PLOWS.

Specification forming part of Letters Patent No. 211,007, dated December 17, 1878; application filed June 10, 1878.

*To all whom it may concern:*

Be it known that I, GEORGE W. GREENER, of Long Point, in the county of Livingston and State of Illinois, have invented certain new and useful Improvements in Sulky-Plows; and I do hereby declare the following to be a full, clear, and exact description of the invention, such as will enable others skilled in the art to which it pertains to make and use it, reference being had to the accompanying drawings, which form part of this specification.

My invention relates to an improvement in sulky-plows; and it consists in the arrangement and combination of parts, whereby the wheel may be raised or lowered upon either side and the plow readily controlled, as will be more fully described hereinafter.

The accompanying drawings represent my invention.

Figure 1:
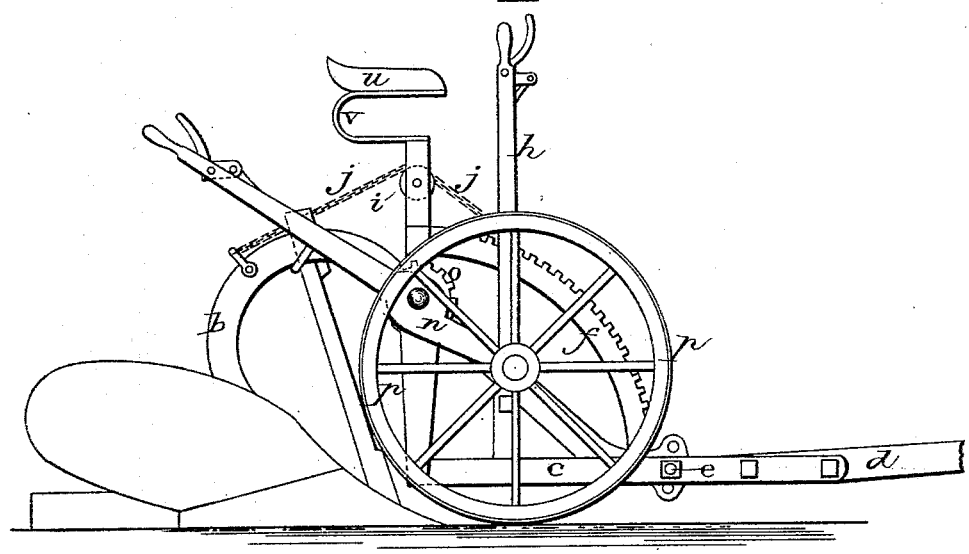
Figure 2:
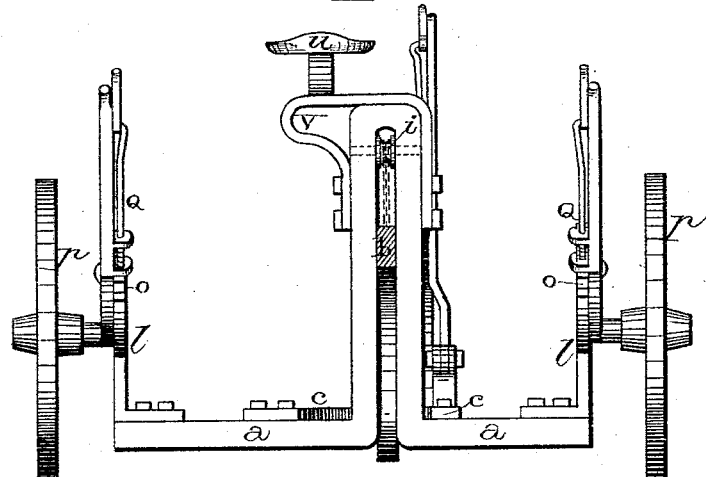

Figure 1 is a side elevation of my invention. Fig. 2 is a rear view of the same.

$a$ represents the axle, which is made U-shaped at or near its center, so as to form a guide for the plow-beam $b$, and to allow the beam a vertical movement, so that it can be raised from and lowered down into the earth. Upon each side of the bend in the axle is secured a horizontal bar, $c$, which projects forward a suitable distance, and between the front ends of the two is rigidly secured the tongue $d$.

In the rear of the hind end of the tongue a pivoting-bolt, $e$, is passed through the two bars $c$ and the front end of the plow-beam $b$, the said beam having a series of holes through it, so that the end can be adjusted up or down, and thus cause the furrow to be shallow or deep.

Secured upon the top of the right-hand bar $c$, and to the side of the bent portion of the axle, is the curved rack $f$, in which the spring-catch $g$ snaps, the catch being secured to the lever $h$. To the lever is fastened the elevating-chain $j$, which passes back over the top of the roller $i$, which is pivoted in the upper end of the space formed by the bend of the axle, and is fastened to the top of the plow.

By moving the lever $h$ back and forth, the plow can be raised above and lowered down to the earth.

It will be noticed that the space between the bent portions of the axle is just wide enough to allow the beam to move freely up and down, but will not allow it the slightest lateral play.

Secured one upon the top of each end of the axle are the right-angular standards or supports $l$, which have their upper ends made circular, and provided with a number of recesses, $o$. Pivoted to the outer sides of these standards are the levers $n$, which are formed in a single piece with the axles upon which the driving-wheels $p$ are placed.

By moving the levers $n$ (which are provided with suitable catches Q) back and forth, the driving-wheels may be depressed, so as to cause the axle to be raised upward and the plow to cut but a shallow furrow; or the wheels may be raised upward and the plow made to cut a deep furrow.

As the two levers are adjustable independently of each other, one wheel may be depressed and the other raised, so as to cause one side of the machine to run higher than the other, as when one wheel has to run in the furrow.

Each of the levers $n$ is provided with a catch, Q, to catch in the recesses or notches $o$, and thus hold the wheels in any desired position.

Fastened to the top of the bent portion of the axle is the support $v$, to which the seat $u$ is secured. Thus it will be seen that the bent portion of the axle serves as a support for the seat, a guide for the plow-beam, and to receive the roller over which the chain passes.

I am aware that axles have heretofore been made with bends in them that act, in conjunction with other parts, as guides for the vertical movements of the plow-beams, and this I disclaim.

My invention consists in forming the bend of such a shape that the roller $i$ can be secured in its upper end by means of a single bolt, and so that it will act as a guide for the plow-beam without any intermediate parts.

Having thus described my invention, I claim—

The axle $a$, having the U-shaped bend at or near its center, the said bend being made to support the seat, and just wide enough to act as a guide for the plow-beam, and to receive the roller over which the elevating-chain passes, substantially as shown.

In testimony that I claim the foregoing I have hereunto set my hand this 30th day of May, 1878.

GEORGE W. GREENER.

Witnesses:
J. N. MARKLE,
W. T. BOSSERMAN.